G. B. N. DOW & J. F. CAVANAUGH.
KNIFE SHARPENER.
APPLICATION FILED SEPT. 4, 1914.

1,127,869.

Patented Feb. 9, 1915.

G. B. N. Dow and
J. F. Cavanaugh
Inventors,

Witnesses
H. B. Wooden.
M. E. McCarthy.

by C. A. Snow & Co.
Attorneys.

UNITED STATES PATENT OFFICE.

GEORGE B. N. DOW AND JAMES F. CAVANAUGH, OF MANCHESTER, NEW HAMPSHIRE.

KNIFE-SHARPENER.

1,127,869.　　　　　Specification of Letters Patent.　　　Patented Feb. 9, 1915.

Application filed September 4, 1914. Serial No. 860,265.

*To all whom it may concern:*

Be it known that we, GEORGE B. N. DOW and JAMES F. CAVANAUGH, citizens of the United States, residing at Manchester, in the county of Hillsboro, State of New Hampshire, have invented a new and useful Knife-Sharpener, of which the following is a specification.

The device forming the subject matter of this application is a sharpening implement of that general type shown in Patent No. 1,016,615, granted on the sixth day of February, 1912, to the present applicant George B. N. Dow jointly with one Walsh.

The present invention aims to improve the structure shown in the patent above mentioned, by reducing the number of parts and simplifying the structure.

Another object of the invention is to provide a construction in which one of the cutting notches only, is open at a time, it being possible to close both of the cutting notches, at the will of the operator.

The invention aims to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

Figure 1:
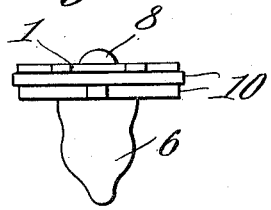
Figure 2:
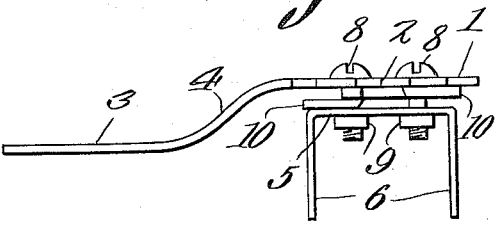
Figure 3:
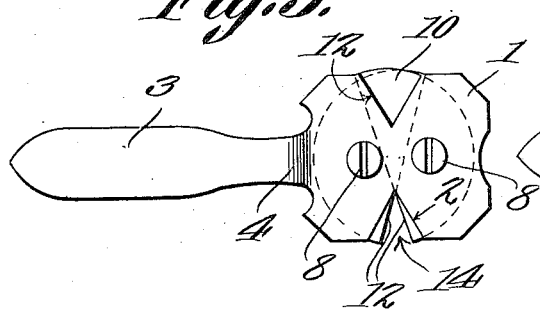
Figure 4:
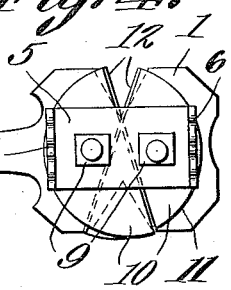
Figure 5:
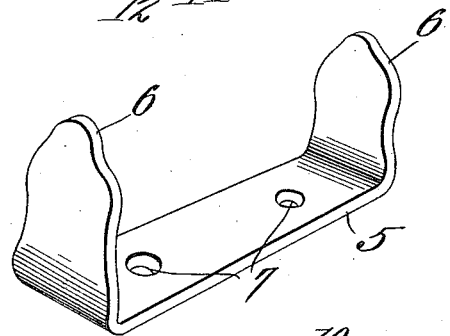
Figure 6:
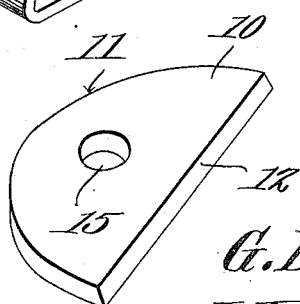

In the accompanying drawings:—Figure 1 is an end elevation depicting the sharpening instrument forming the subject matter of this application; Fig. 2 shows the sharpener in side elevation; Fig. 3 is a top plan thereof; Fig. 4 is a bottom plan of the sharpener; Fig. 5 is a perspective of the support, the same being inverted; Fig. 6 is a perspective showing one of the sharpening blades.

The sharpener herein disclosed preferably is fashioned from metal throughout and embodies a bed plate 1 provided in its opposite edges with notches 2. The bed plate 1 is reduced in width to fashion an integrally formed handle 3 which intermediate its ends is bent downwardly as shown at 4.

The invention comprises an arched support shown at 5. The support 5 is provided at its ends with a single pair of legs 6, the support extending longitudinally of the handle 3 and being disposed immediately below the base plate 1. In the crown of the support 5, openings 7 are formed. Combined pivot and clamping elements 8, which may be bolts, pass downwardly through the base plate 1 and through the openings 7 in the support 5. To the lower ends of the bolts 8 nuts 9 are applied, the nut bearing against the under face of the crown of the support 5.

Interposed between the bed plate 1 and the crown of the support 5 are overlapped blades 10, the outer edges 11 of which preferably are curved, the inner edges 12 of which are sharpened to form cutting elements. The blades 10 are equipped with openings 15 through which the securing bolts 8 pass.

When the device is not in use, or when it is being shipped as an article of commerce, the nuts 9 may be loosened and the sharpened cutting edges 12 of the blades 10 may be brought into parallelism with each other, whereupon, when the nuts 9 are tightened, one blade 10 will overlap the other adjacent their sharpened cutting edges 12, thus to shield and protect the blades against accidental dulling. When, however, it is desired to use the sharpener, the blades 10 may be swung upon the pivot elements 8 so as to open a notch 14 at either side of the sharpener, the device being adapted for use by persons who are left handed as well as by those who are right handed. It is to be observed, noting particularly Fig. 3, that one cutting notch always is closed and it is impossible to dull accidentally, those portions of the blades which are not in use.

The bed plate 1 exercises a double function in that it constitutes one member of a two-part, blade holding flange and constitutes as well, a part of the handle 3. The support 5 exercises two functions, in that it serves to withhold the device when in use and serves also as the other member of the two-part clamp above mentioned.

Especial attention is directed to the fact that the arched support 5 extends longitudinally of the handle 3, beneath the bed plate 1, and not transversely of the handle 3 beneath the bed plate 1. Owing to this construction the legs 6 are located directly below the handle 3 and one single pair of legs is made efficient to support the device, whether the same be used right handed or left handed. It is to be observed, further, that by this construction, the legs 6 do not lie beneath the cutting notch 14. If the support 5 extended transversely of the handle 3 beneath the bed plate 1, but one of the legs 6 at a time would serve as a support, and the other leg 6 would be located directly beneath the notch 14. Then, in order that the edge of the knife, when drawn through the cutting notch 14, might not strike the adjacent leg 6, it would be necessary to notch or cut away said leg adjacent its lower edge. No such construction is necessary in the present invention, the legs 6 at all times lying upon opposite sides of the notch 14 and out of the way of the edge of the knife which is being sharpened.

It will be understood that in practical operation, referring particularly to Figs. 2 and 3, the device, when in use, is swung over until it is supported by the legs 6, the handle 3 and the rear portions of the blades 10 (or by the rear edge of the bed plate 1 if the blades 10, measured along their edges 12 are not quite so large as shown in the drawings). Under such circumstances, the bed plate 1 is disposed at an angle to the vertical, and the knife or other tool which is to be sharpened is drawn through the notch 14.

Having thus described the invention, what is claimed is:—

1. A knife sharpener embodying a bed plate having a handle; an arched support located below the bed plate and extended longitudinally of the handle, the support terminating at its ends in a single pair of legs; a pair of blades located between the bed plate and the support and engaged directly thereby; and a securing device uniting the bed plate with the support whereby the bed plate and the support will form clamps for the blades.

2. A knife sharpener embodying a bed plate; an arched support located below the bed plate; combined clamping and pivot elements connecting the bed plate and the support; and a pair of blades located between the bed plate and the support, the combined clamping and pivot elements extending through the blades; the blades having cutting edges and being overlapped to protect the cutting edges of the blades when the cutting edges of the respective blades are disposed in approximate parallelism, the blades being adjustable on the pivot and clamping elements to open a cutting notch between said edges at either end of the cutting edges.

3. A knife sharpener embodying a bed plate having a handle; an arched support located below the bed plate and extended longitudinally of the handle, the support terminating at its ends in a single pair of legs; combined clamping and pivot elements connecting the bed plate and the support; and a pair of blades located between the bed plate and the support, the combined clamping and pivot elements extending through the blades; the blades having cutting edges and being overlapped when the cutting edges of the respective blades are disposed in approximate parallelism, the blades being adjustable upon the clamping and pivot elements to open a cutting notch between said edges at either end of the cutting edges.

In testimony that we claim the foregoing as our own, we have hereto affixed our signatures in the presence of two witnesses.

GEORGE B. N. DOW.
JAMES F. CAVANAUGH.

Witnesses:
FRED E. WAY,
HAROLD W. LOVERN.

Copies of this patent may be obtained for five cents each, by addressing the "Commissioner of Patents, Washington, D. C."